(12) United States Patent
Steinberg et al.

(10) Patent No.: US 8,363,908 B2
(45) Date of Patent: Jan. 29, 2013

(54) FOREGROUND / BACKGROUND SEPARATION IN DIGITAL IMAGES

(75) Inventors: Eran Steinberg, San Francisco, CA (US); Peter Corcoran, Claregalway (IE); Yury Prilutsky, San Mateo, CA (US); Petronel Bigioi, Galway (IE); Alexei Pososin, Galway (IE); Mihai Ciuc, Bucharesti (RO); Adrian Zamfir, Bucharest (RO); Adrian Capata, Galway (IE)

(73) Assignee: DigitalOptics Corporation Europe Limited, Galway (IE)

( * ) Notice: Subject to any disclaimer, the term of this patent is extended or adjusted under 35 U.S.C. 154(b) by 252 days.

(21) Appl. No.: 11/744,020

(22) Filed: May 3, 2007

(65) Prior Publication Data

US 2007/0269108 A1    Nov. 22, 2007

Related U.S. Application Data

(60) Provisional application No. 60/746,363, filed on May 3, 2006.

(51) Int. Cl.
*G06K 9/00* (2006.01)
(52) U.S. Cl. .......................................... 382/118; 382/173
(58) Field of Classification Search .................... 382/173
See application file for complete search history.

(56) References Cited

U.S. PATENT DOCUMENTS

| | | | |
|---|---|---|---|
| 4,683,496 A | 7/1987 | Tom | |
| 5,046,118 A * | 9/1991 | Ajewole et al. | 382/169 |
| 5,063,448 A | 11/1991 | Jaffray et al. | |
| 5,086,314 A | 2/1992 | Aoki et al. | |
| 5,109,425 A | 4/1992 | Lawton | |
| 5,130,935 A * | 7/1992 | Takiguchi | 382/167 |
| 5,164,993 A | 11/1992 | Capozzi et al. | |
| 5,231,674 A | 7/1993 | Cleaveland et al. | |
| 5,329,379 A | 7/1994 | Rodriguez et al. | |
| 5,500,685 A | 3/1996 | Kokaram | |
| 5,504,846 A | 4/1996 | Fisher | |
| 5,534,924 A | 7/1996 | Florant | |
| 5,594,816 A | 1/1997 | Kaplan et al. | |
| 5,621,868 A | 4/1997 | Mizutani et al. | |
| 5,724,456 A | 3/1998 | Boyack et al. | |
| 5,812,787 A | 9/1998 | Astle | |
| 5,844,627 A | 12/1998 | May et al. | |

(Continued)

FOREIGN PATENT DOCUMENTS

| | | |
|---|---|---|
| EP | 1367538 A2 | 12/2003 |
| EP | 1800259 B1 | 1/2008 |

(Continued)

OTHER PUBLICATIONS

Swain et al., "Defocus-based image segmentation," May 1995, IEEE, vol. 4, pp. 2403-2406.*

(Continued)

*Primary Examiner* — John Strege
(74) *Attorney, Agent, or Firm* — Andrew V. Smith

(57) ABSTRACT

A method for providing improved foreground/background separation in a digital image of a scene is disclosed. The method comprises providing a first map comprising one or more regions provisionally defined as one of foreground or background within the digital image; and providing a subject profile corresponding to a region of interest of the digital image. The provisionally defined regions are compared with the subject profile to determine if any of the regions intersect with the profile region. The definition of one or more of the regions in the map is changed based on the comparison.

29 Claims, 9 Drawing Sheets

U.S. PATENT DOCUMENTS

| | | | | |
|---|---|---|---|---|
| 5,878,152 | A | 3/1999 | Sussman | |
| 5,880,737 | A | 3/1999 | Griffin et al. | |
| 5,949,914 | A | 9/1999 | Yuen | |
| 5,990,904 | A | 11/1999 | Griffin | |
| 6,005,959 | A | 12/1999 | Mohan et al. | |
| 6,008,820 | A | 12/1999 | Chauvin et al. | |
| 6,018,590 | A * | 1/2000 | Gaborski | 382/168 |
| 6,061,476 | A * | 5/2000 | Nichani | 382/270 |
| 6,069,635 | A | 5/2000 | Suzuoki et al. | |
| 6,069,982 | A | 5/2000 | Reuman | |
| 6,122,408 | A | 9/2000 | Fang et al. | |
| 6,125,213 | A | 9/2000 | Morimoto | |
| 6,198,505 | B1 | 3/2001 | Turner et al. | |
| 6,240,217 | B1 | 5/2001 | Ercan et al. | |
| 6,243,070 | B1 | 6/2001 | Hill et al. | |
| 6,282,317 | B1 | 8/2001 | Luo et al. | |
| 6,292,194 | B1 | 9/2001 | Powell, III | |
| 6,295,367 | B1 | 9/2001 | Crabtree et al. | |
| 6,326,964 | B1 | 12/2001 | Snyder et al. | |
| 6,407,777 | B1 | 6/2002 | DeLuca | |
| 6,483,521 | B1 | 11/2002 | Takahashi et al. | |
| 6,526,161 | B1 * | 2/2003 | Yan | 382/118 |
| 6,535,632 | B1 | 3/2003 | Park et al. | |
| 6,538,656 | B1 | 3/2003 | Cheung et al. | |
| 6,577,762 | B1 | 6/2003 | Seeger et al. | |
| 6,577,821 | B2 | 6/2003 | Malloy Desormeaux | |
| 6,593,925 | B1 | 7/2003 | Hakura et al. | |
| 6,631,206 | B1 | 10/2003 | Cheng et al. | |
| 6,670,963 | B2 | 12/2003 | Osberger | |
| 6,678,413 | B1 | 1/2004 | Liang et al. | |
| 6,683,992 | B2 | 1/2004 | Takahashi et al. | |
| 6,744,471 | B1 | 6/2004 | Kakinuma et al. | |
| 6,756,993 | B2 | 6/2004 | Popescu et al. | |
| 6,781,598 | B1 | 8/2004 | Yamamoto et al. | |
| 6,803,954 | B1 | 10/2004 | Hong et al. | |
| 6,804,408 | B1 | 10/2004 | Gallagher et al. | |
| 6,807,301 | B1 | 10/2004 | Tanaka | |
| 6,836,273 | B1 | 12/2004 | Kadono | |
| 6,842,196 | B1 | 1/2005 | Swift et al. | |
| 6,850,236 | B2 | 2/2005 | Deering | |
| 6,930,718 | B2 | 8/2005 | Parulski et al. | |
| 6,952,225 | B1 | 10/2005 | Hyodo et al. | |
| 6,956,573 | B1 | 10/2005 | Bergen et al. | |
| 6,987,535 | B1 | 1/2006 | Matsugu et al. | |
| 6,989,859 | B2 | 1/2006 | Parulski | |
| 6,990,252 | B2 | 1/2006 | Shekter | |
| 7,013,025 | B2 | 3/2006 | Hiramatsu | |
| 7,027,643 | B2 | 4/2006 | Comaniciu et al. | |
| 7,035,477 | B2 | 4/2006 | Cheatle | |
| 7,042,505 | B1 | 5/2006 | DeLuca | |
| 7,054,478 | B2 | 5/2006 | Harman | |
| 7,064,810 | B2 | 6/2006 | Anderson et al. | |
| 7,081,892 | B2 | 7/2006 | Alkouh | |
| 7,102,638 | B2 | 9/2006 | Raskar et al. | |
| 7,103,227 | B2 | 9/2006 | Raskar et al. | |
| 7,103,357 | B2 | 9/2006 | Kirani et al. | |
| 7,130,453 | B2 | 10/2006 | Kondo et al. | |
| 7,149,974 | B2 | 12/2006 | Girgensohn et al. | |
| 7,206,449 | B2 | 4/2007 | Raskar et al. | |
| 7,218,792 | B2 | 5/2007 | Raskar et al. | |
| 7,295,720 | B2 | 11/2007 | Raskar | |
| 7,317,843 | B2 | 1/2008 | Sun et al. | |
| 7,359,562 | B2 | 4/2008 | Raskar et al. | |
| 7,394,489 | B2 | 7/2008 | Yagi | |
| 7,469,071 | B2 | 12/2008 | Drimbarean et al. | |
| 7,574,069 | B2 | 8/2009 | Setlur et al. | |
| 7,593,603 | B1 | 9/2009 | Wilensky | |
| 7,613,332 | B2 | 11/2009 | Enomoto et al. | |
| 7,630,006 | B2 | 12/2009 | DeLuca et al. | |
| 7,657,060 | B2 | 2/2010 | Cohen et al. | |
| 7,702,149 | B2 | 4/2010 | Ohkubo et al. | |
| 7,747,071 | B2 | 6/2010 | Yen et al. | |
| 8,045,801 | B2 | 10/2011 | Kanatsu | |
| 2001/0000710 | A1 | 5/2001 | Queiroz et al. | |
| 2001/0012063 | A1 | 8/2001 | Maeda | |
| 2001/0017627 | A1 | 8/2001 | Marsden et al. | |
| 2001/0053292 | A1 * | 12/2001 | Nakamura | 396/661 |
| 2002/0028014 | A1 * | 3/2002 | Ono | 382/154 |
| 2002/0031258 | A1 | 3/2002 | Namikata | |
| 2002/0076100 | A1 * | 6/2002 | Luo | 382/164 |
| 2002/0080261 | A1 | 6/2002 | Kitamura et al. | |
| 2002/0080998 | A1 | 6/2002 | Matsukawa et al. | |
| 2002/0089514 | A1 | 7/2002 | Kitahara et al. | |
| 2002/0093670 | A1 | 7/2002 | Luo et al. | |
| 2002/0180748 | A1 | 12/2002 | Popescu et al. | |
| 2002/0191860 | A1 * | 12/2002 | Cheatle | 382/282 |
| 2003/0038798 | A1 | 2/2003 | Besl et al. | |
| 2003/0039402 | A1 | 2/2003 | Robins et al. | |
| 2003/0052991 | A1 | 3/2003 | Stavely et al. | |
| 2003/0063795 | A1 * | 4/2003 | Trajkovic et al. | 382/159 |
| 2003/0086134 | A1 | 5/2003 | Enomoto | |
| 2003/0086164 | A1 | 5/2003 | Abe | |
| 2003/0091225 | A1 * | 5/2003 | Chen | 382/145 |
| 2003/0103159 | A1 | 6/2003 | Nonaka | |
| 2003/0123713 | A1 * | 7/2003 | Geng | 382/118 |
| 2003/0161506 | A1 | 8/2003 | Velazquez et al. | |
| 2003/0169944 | A1 | 9/2003 | Dowski et al. | |
| 2003/0184671 | A1 | 10/2003 | Robins et al. | |
| 2004/0047513 | A1 * | 3/2004 | Kondo et al. | 382/254 |
| 2004/0080623 | A1 | 4/2004 | Cleveland et al. | |
| 2004/0109614 | A1 | 6/2004 | Enomoto et al. | |
| 2004/0145659 | A1 * | 7/2004 | Someya et al. | 348/207.99 |
| 2004/0189822 | A1 | 9/2004 | Shimada | |
| 2004/0201753 | A1 | 10/2004 | Kondo et al. | |
| 2004/0208385 | A1 | 10/2004 | Jiang | |
| 2004/0223063 | A1 | 11/2004 | DeLuca et al. | |
| 2005/0017968 | A1 | 1/2005 | Wurmlin et al. | |
| 2005/0031224 | A1 | 2/2005 | Prilutsky et al. | |
| 2005/0041121 | A1 | 2/2005 | Steinberg et al. | |
| 2005/0058322 | A1 * | 3/2005 | Farmer et al. | 382/103 |
| 2005/0140801 | A1 | 6/2005 | Prilutsky et al. | |
| 2005/0213849 | A1 | 9/2005 | Kreang-Arekul et al. | |
| 2005/0243176 | A1 | 11/2005 | Wu et al. | |
| 2005/0271289 | A1 | 12/2005 | Rastogi | |
| 2006/0008171 | A1 | 1/2006 | Petschnigg et al. | |
| 2006/0039690 | A1 | 2/2006 | Steinberg et al. | |
| 2006/0098889 | A1 | 5/2006 | Luo et al. | |
| 2006/0104508 | A1 | 5/2006 | Daly et al. | |
| 2006/0153471 | A1 | 7/2006 | Lim et al. | |
| 2006/0171587 | A1 | 8/2006 | Kanatsu | |
| 2006/0181549 | A1 | 8/2006 | Alkouh | |
| 2006/0193509 | A1 * | 8/2006 | Criminisi et al. | 382/154 |
| 2006/0280361 | A1 | 12/2006 | Umeda | |
| 2006/0280375 | A1 | 12/2006 | Dalton et al. | |
| 2006/0285754 | A1 | 12/2006 | Steinberg et al. | |
| 2007/0098260 | A1 | 5/2007 | Yen et al. | |
| 2007/0237355 | A1 * | 10/2007 | Song et al. | 382/100 |
| 2008/0112599 | A1 | 5/2008 | Capata et al. | |
| 2008/0219518 | A1 | 9/2008 | Steinberg et al. | |
| 2011/0222730 | A1 | 9/2011 | Steinberg et al. | |

FOREIGN PATENT DOCUMENTS

| | | |
|---|---|---|
| EP | 2227002 A2 | 9/2008 |
| EP | 1918872 B1 | 7/2009 |
| EP | 2165523 B1 | 4/2011 |
| JP | 2281879 A2 | 11/1990 |
| JP | 4127675 A2 | 4/1992 |
| JP | 6014193 A2 | 1/1994 |
| JP | 8223569 A2 | 8/1996 |
| JP | 10285611 A2 | 10/1998 |
| JP | 2000-102040 A2 | 4/2000 |
| JP | 2000-299789 A2 | 10/2000 |
| JP | 2001-101426 A2 | 4/2001 |
| JP | 2001-223903 A2 | 8/2001 |
| JP | 2001-229390 A | 8/2001 |
| JP | 2002-112095 A2 | 4/2002 |
| JP | 2002-373337 A | 12/2002 |
| JP | 2003-058894 A | 2/2003 |
| JP | 2003-281526 A2 | 10/2003 |
| JP | 2004-064454 | 2/2004 |
| JP | 2004-166221 A2 | 6/2004 |
| JP | 2004-185183 A2 | 7/2004 |
| JP | 2004-236235 A | 8/2004 |
| JP | 2005-004799 A | 1/2005 |
| JP | 2005-229198 A | 8/2005 |
| JP | 2006-024206 | 1/2006 |
| JP | 2006-080632 A2 | 3/2006 |

| | | | |
|---|---|---|---|
| JP | 2006-140594 A2 | 6/2006 | |
| WO | WO-9426057 A1 | 11/1994 | |
| WO | WO 02052839 A2 | 7/2002 | |
| WO | WO-02089046 A1 | 11/2002 | |
| WO | WO03/019473 A1 | 3/2003 | |
| WO | WO-2004017493 A1 | 2/2004 | |
| WO | WO-2004036378 A2 | 4/2004 | |
| WO | WO-2004059574 A2 | 7/2004 | |
| WO | WO2005/015896 A1 | 2/2005 | |
| WO | WO-2005015896 A1 | 2/2005 | |
| WO | WO2005/076217 A2 | 8/2005 | |
| WO | WO-2005076217 A2 | 8/2005 | |
| WO | WO2005/076217 A9 | 10/2005 | |
| WO | WO 2005099423 A2 | 10/2005 | |
| WO | WO-2005101309 A1 | 10/2005 | |
| WO | WO2005/076217 A3 | 4/2006 | |
| WO | 2006/045441 A1 | 5/2006 | |
| WO | 2006/050782 A1 | 5/2006 | |
| WO | WO-2007025578 A1 | 3/2007 | |
| WO | WO-2007073781 A1 | 7/2007 | |
| WO | 2007/093199 A2 | 8/2007 | |
| WO | WO-2007093199 A2 | 8/2007 | |
| WO | WO-2007095477 A2 | 8/2007 | |
| WO | 2007/093199 A3 | 3/2008 | |
| WO | WO2008/109708 A1 | 9/2008 | |
| WO | WO2010/017953 A1 | 2/2010 | |

OTHER PUBLICATIONS

Ashikhmin, Michael, "A tone mapping algorithm for high contrast images," ACM International Conference Proceeding Series; vol. 28, Proceedings of the 13th Eurographics workshop on Rendering, pp. 145-156, Year of Publication: 2002, ISBN:1-58113-534-3. http://portal.acm.org/citation.cfm?id=581916&coll=Portal&dl=ACM&CFID=17220933&CFTOKEN=89149269.

Barreiro, R.B., et al., "Effect of component separation on the temperature distribution of the cosmic microwave background," Monthly Notices of the Royal Astronomical Society, 2006, vol. 368, No. 1 (May 1), p. 226-246. Current Contents Search®. Dialog® File No. 440 Accession No. 23119677.

Benedek, C., et al., "Markovian framework for foreground-background-shadow separation of real world video scenes," 7th Asian Conference on Computer Vision, Proceedings v 3851 LNCS 2006., 2006. Ei Compendex®. Dialog® File No. 278 Accession No. 11071345.

Eriksen, H.K., et al., "Cosmic microwave background component separation by parameter estimation," Astrophysical Journal, vol. 641, No. 2, pt. 1, p. 665-82 (2006). INSPEC. Dialog® File No. 2 Accession No. 9947674.

Haneda, E., "Color Imaging XII: Processing, Hardcopy, and Applications," in Proceedings of Society of Optical Engineers, vol. 6493, (Jan. 29, 2007). http://scitation.aip.org/vsearch/servlet/VerityServlet?KEY=FREESR&smode=strresultssort=chron&maxdisp=25&threshold=0&possible1=separation&possible1zone=article&bool1and&possible4=foreground&possible4zone=article&bool4=and&possible2=background&possible2zone=article&fromyear=1893&toyear=2007&OUTLOG=NO&viewabs=PSISDG&key=DISPLAY&docID=1&page=1&chapter=0.

Homayoun Kamkar-Parsi, A., "A multi-criteria model for robust foreground extraction," Proceedings of the third ACM international workshop on Video surveillance & sensor networks, pp. 67-70, Year of Publication: 2005, ISBN:1-59593-242-9. ACM Press. http://portal.acm.org/citation.cfm?id=1099410&coll=Portal&dl=ACM&CFID=17220933&CFTOKEN=89149269.

Jin, J., "Medical Imaging," Proceedings of SPIE—vol. 2710, 1996, Image Processing, Murray H. Loew, Kenneth M. Hanson, Editors, Apr. 1996, pp. 864-868. http://scitation.aip.org/vsearch/servlet/VerityServlet?KEY=FREESR&smode=strresults&sort=chron&maxdisp=25&threshold=0&possible1=separation&possible1zone=article&bool1=and&possible4=foreground&possible4zone=article&bool4=and&possible2=background&possible2zone=article&fromyear=1893&toyear=2007&OUTLOG=NO&viewabs=PSISDG&key=DISPLAY&docID=14&page=1&chapter=0.

Jingyi, Yu, et al., "Real-time reflection mapping with parallax," Symposium on Interactive 3D Graphics, Proceedings of the 2005 symposium on Interactive 3D graphics and games, pp. 133-138, 2005, ISBN: 1-59593-013-2. ACM Press. http//portal.acm.org/citation.cfm?id=1053449&coll=Portal&dl=ACM&CFID=17220933&CFTOKEN=89149269.

Leray, et al., "Spatially distributed two-photon excitation fluorescence in scattering media: Experiments and time-resolved Monte Carlo simulations," Optics Communications vol. 272, Issue 1, Apr. 1, 2007, pp. 269-278. http://www.sciencedirect.com/science?_ob=ArticleURL&_udi=B6TVF-4MFCKHC-7&_user=10&_coverDate=04%2F01%2F2007&_alid=550910686&_rdoc=1&_fmt=summary&_orig=search&_cdi=5533&_sort=d&_docanchor=&view=c&_ct=19&_acct=C000050221&_version=1&_urlVersion=0&_userid=10&md5=ee8131d7f6479ae973e3291a94d997d1.

Liyuan Li, et al., "Foreground object detection from videos containing complex background," Proceedings of the eleventh ACM international conference on Multimedia, pp. 2-10, 2003 ISBN: 1-58113-722-2. ACM Press. http://portal.acm.org/citation.cfm?id=957017&coll=Portal&dl=ACM&CFID=17220933& CFTOKEN=89149269.

Neri, A., et al., "Automatic moving object and background separation," Signal Processing v 66 n 2 Apr. 1998. p. 219-232. Ei Compendex®. Dialog® File No. 278 Accession No. 8063256.

Saito, T., et al., "Separation of irradiance and reflectance from observed color images by logarithmical nonlinear diffusion process," Proceedings of Society for Optical Engineering Computational Imaging IV—Electronic Imaging v 6065 2006. Ei Compendex®. Dialog® File No. 278 Accession No. 10968692.

Simard, Patrice Y., et al., "A foreground/background separation algorithm for image compression," Data Compression Conference Proceedings 2004. Ei Compendex®. Dialog® File No. 278 Accession No. 9897343.

Television Asia, "Virtual sets and chromakey update: superimposing a foreground captured by one camera onto a background from another dates back to film days, but has come a long way since," Television Asia, vol. 13, No. 9, p. 26, Nov. 2006. Business & Industry®. Dialog® File No. 9 Accession No. 4123327.

Tzovaras, D., et al., "Three-dimensional camera motion estimation and foreground/background separation for stereoscopic image sequences," Optical Engineering, vol. 36, No. 2, p. 574-9. Feb. 1997. INSPEC. Dialog® File No. 2 Accession No. 6556637.

Utpal, G., et al., "On foreground-background separation in low quality document images," International Journal on Document Analysis and Recognition, vol. 8, No. 1, p. 47-63. INSPEC. Dialog® File No. 2 Accession No. 9927003.

"Rational Filters for Passive Depth from Defocus" by Masahiro Watanabe and Shree K. Nayar (1995).

PCT Notification of Transmittal of the International Search Report and the Written Opinion of the International Searching Authority, or the Declaration, PCT/US07/61956, dated Mar. 14, 2008, 9 pages.

PCT International Search Report, PCT/US2007/068190, dated Sep. 29, 2008, 4 pages.

Adelson, E.H., "Layered Representations for Image Coding, http://web.mit.edu/persci/people/adelson/pub.sub.—pdfs/layers91.pdf.", Massachusetts Institute of Technology, 1991, 20 pages.

Aizawa, K. et al., "Producing object-based special effects by fusing multiple differently focused images, http://rlinks2.dialog.com/NASApp/ChannelWEB/DialogProServlet?ChName=engineering", IEEE transactions on circuits and systems for video technology, 2000, pp. 323-330, vol. 10—Issue 2.

Bei R, Thaddeus, "Feature-Based Image Metamorphosis," In Siggraph '92, Silicon Graphics Computer Systems, 2011 Shoreline Blvd. Mountain View CA 94043, http://www.hammerhead.com/thad/thad.html.

Boutell, M. et al., "Photo classification by integrating image content and camera metadata", Pattern Recognition, Proceedings of the 17th International Conference, 2004, pp. 901-904, vol. 4.

Chen, Shenchang et al., "View interpolation for image synthesis, ISBN:0-89791-601-8, http://portal.acm.org/citation.cfm?id=166153&coli=GUIDE&dl=GUIDE&CFID=680-9268&CFTOKEN=82843223.", International Conference on Computer Graphics and Interactive Techniques, Proceedings of the 20th annual conference on Computer graphics and interactive techniques, 1993, pp. 279-288, ACM Press.

Eisemann, E. et al., "Flash Photography Enhancement via Intrinsic Relighting, ACM Transactions on URL: http://graphics.stanford.edu/{georgp/vision.htm", 2002, pp. 1-12.

European Patent Office, Communication pursuant to Article 94(3) EPC for EP Application No. 06776529.7, dated Jan. 30, 2008, 3 pages.

European Patent Office, extended European Search Report for EP application No. 07024773.9, dated Jun. 3, 2008, 5 pages.

European Patent Office, extended European Search Report for EP application No. 07756848.3, dated May 27, 2009, 4 pages.

Favaro, Paolo, "Depth from focus/defocus, http://homepages.inf.ed.ac.uk/rbf/Cvonline/LOCAL_COPIES/FAVARO1/dfdtutorial.html.", 2002.

Final Office Action mailed Feb. 4, 2009, for U.S. Appl. No. 11/319,766, filed Dec. 27, 2005.

Final Office Action mailed Sep. 18, 2009, for U.S. Appl. No. 11/319,766, filed Dec. 27, 2005.

Hashi Yuzuru et al., "A New Method to Make Special Video Effects. Trace and Emphasis of Main Portion of Images, Japan Broadcasting Corp., Sci. and Techical Res. Lab., JPN, Eizo Joho Media Gakkai Gijutsu Hokoku, http://rlinks2.dialog.com/NASApp/ChannelWEB/DialogProServlet?ChName=engineering", 2003, pp. 23-26, vol. 27.

Heckbert, Paul S., "Survey of Texture Mapping, http://citeseer.ist.psu.edu/135643.html", Proceedings of Graphics Interface '86. IEEE Computer Graphics and Applications, 1986, pp. 56-67 & 207-212.

Jin, Hailin et al., "A Variational Approach to Shape from Defocus, {ECCV} (2), http://citeseerist.psu.edu/554899.html", 2002, pp. 18-30.

Kelby, Scott, "Photoshop Elements 3: Down & Dirty Tricks, ISBN: 0-321-27835-6, One Hour Photo: Portrait and studio effects", 2004, Chapter 1, Peachpit Press.

Kelby, Scott, "The Photoshop Elements 4 Book for Digital Photographers, XP002406720, ISBN: 0-321-38483-0, Section: Tagging Images of People (Face Tagging)", 2005, New Riders.

Khan, E.A., "Image-based material editing, http://portal.acm.org/citation.cfm?id=1141937&coll=GUIDE&dl=GUIDE&CFID=68-09268&CFTOKEN=82843223", International Conference on Computer Graphics and Interactive Techniques, 2006, pp. 654 663, ACM Press.

Komatsu, Kunitoshi et al., "Design of Lossless Block Transforms and Filter Banks for Image Coding, http://citeseerist.psu.edu/komatsu99design.html".

Leubner, Christian, "Multilevel Image Segmentation in Computer-Vision Systems, http://citeseerist.psu.edu/565983.html".

Li, Han et al., "A new model of motion blurred images and estimation of its parameter", Acoustics, Speech, and Signal Processing, IEEE International Conference on ICASSP '86, 1986, pp. 2447-2450, vol. 11.

Li, S. et al., "Multifocus image fusion using artificial neural networks, DOI=http://dx.doi.org/10.1016/S0167-8655(02)00029-6", Pattern Recogn. Lett, 2002, pp. 985-997, vol. 23.

McGuire, M. et al., "Defocus video matting, DOI=http://doi.acm.org/10.1145/1073204.1073231", ACM Trans. Graph., 2005, pp. 567-576, vol. 24—Issue 3.

Non-Final Office Action mailed Aug. 6, 2008, for U.S. Appl. No. 11/319,766, filed Dec. 27, 2005.

Non-Final Office Action mailed Jul. 13, 2009, for U.S. Appl. No. 11/421,027, filed May 30, 2006.

Non-Final Office Action mailed Mar. 10, 2009, for U.S. Appl. No. 11/217,788, filed Aug. 30, 2005.

Non-Final Office Action mailed Nov. 25, 2008, for U.S. Appl. No. 11/217,788, filed Aug. 30, 2005.

Office Action in co-pending European Application No. 06 776 529.7-2202, entitled "Communication Pursuant to Article 94(3) EPC", dated Sep. 30, 2008, 3 pages.

Owens, James, "Method for depth of field (DOE) adjustment using a combination of object segmentation and pixel binning", Research Disclosure, 2004, vol. 478, No. 97, Mason Publications.

Pavlidis Tsompanopoulos Papamarkos, "A Multi-Segment Residual Image Compression Technique"http://citeseerist.psu.edu/554555.html.

PCT International Preliminary Report on Patentability, for PCT Application No. PCT/EP2006/007573, dated Jul. 1, 2008, 9 pages.

PCT International Preliminary Report on Patentability, for PCT Application No. PCT/EP2006/008229, dated Aug. 19, 2008, 15 pages.

PCT International Preliminary Report on Patentability, for PCT Application No. PCT/US2007/061956, dated Oct. 27, 2008, 3 pages.

PCT International Preliminary Report on Patentability, for PCT Application No. PCT/US2007/068190, dated Nov. 4, 2008, 8 pages.

PCT Notification of Transmittal of the International Search Report and the Written Opinion of the International Searching Authority, or the Declaration (PCT/EP2006/007573), dated Nov. 27, 2006.

PCT Notification of Transmittal of the International Search Report and the Written Opinion of the International Searching Authority, or the Declaration for PCT application No. PCT/EP2006/008229, dated Jan. 14, 2008, 18 pages.

PCT Notification of Transmittal of the International Search Report and the Written Opinion of the International Searching Authority, or the Declaration, for PCT Application No. PCT/EP2006/005109, Oct. 4, 2006, 14 pages.

Petschnigg, G. et al., "Digital Photography with Flash and No Flash Image Pairs", The Institution of Electrical Engineers, 2004, pp. 664-672.

Potmesil, Michael et al., "A lens and aperture camera model for synthetic image generation, ISBN:0-89791-045-1, http://portal.acm.org/citation.cfm?id=806818&coli=GUIDE&dl=GUIDE&CFID=680-9268&CFTOKEN=82843222.", International Conference on Computer Graphics and Interactive Techniques, Proceedings of the 8th annual conference on Computer graphics and interactive techniques, 1981, pp. 297-305, ACM Press.

Rajagopalan, A.N. et al., "Optimal recovery of depth from defocused images using an mrf model, http://citeseer.ist.psu.edu/rajagopalan98optimal.html", In Proc. International Conference on Computer Vision, 1998, pp. 1047-1052.

Reinhard, E. et al., "Depth-of-field-based alpha-matte extraction, http://doi.acm.org/10.1145/1080402.1080419", In Proceedings of the 2nd Symposium on Applied Perception in Graphics and Visualization, 2005, pp. 95-102, vol. 95.

Sa, A. et al., "Range-Enhanced Active Foreground Extraction, XP010851333", Image Processing, IEEE International Conference, 2005, pp. 81-84.

Schechner, Y.Y. et al., "Separation of transparent layers using focus, http:l/citeseer.ist.psu.edu/article/schechner98separation.html", Proc. ICCV, 1998, pp. 1061-1066.

Serrano, N. et al., "A computationally efficient approach to indoor/outdoor scene classification, XP010613491, ISBN: 978-0-7695-1695-0.", Pattern Recognition, 2002 Proceedings. 16th Intl Conference, IEEE Comput. Soc, 2002, pp. 146-149, vol. 4.

Subbarao, M. et al., "Depth from Defocus: A Spatial Domain Approach, Technical Report No. 9212.03, http://citeseerist.psu.edu/subbarao94depth.html", Computer Vision Laboratory, SUNY.

Subbarao, Murali et al., "Noise Sensitivity Analysis of Depth-from-Defocus by a Spatial-Domain Approach, http://citeseer.ist.psu.edu/subbarao97noise.html".

Sun, J. et al., "Flash Matting", ACM Transactions on Graphics, 2006, pp. 772-778, vol. 25—Issue 3.

Swain C. and Chen T. "Defocus-based image segmentation" In Proceedings ICASSP-95, vol. 4, pp. 2403-2406, Detroit, MI, May 1995, IEEE, http://citeseerist.psu.edu/swain95defocusbased_html, Sun, J., Li, Y., Kang, S. B., and Shum, H. 2006. Flash matting.

Szummer, M. et al., "Indoor-outdoor image classification", Content-Based Access of Image and Video Database, Proceedings., IEEE International Workshop, IEEE Comput. Soc, 1998, pp. 42-51.

U.S. Appl. No. 10/772,767, filed Feb. 4, 2004, by inventors Michael J. DeLuca, et al.

Ziou, D. et al., "Depth from Defocus Estimation in Spatial Domain, http://citeseer.ist.psu.edu/ziou99depth.html", CVIU, 2001, pp. 143-165, vol. 81—Issue 2.

Corinne Vachier, Luc Vincent, Valuation of Image Extrema Using Alternating Filters by Reconstruction, Proceedings of the SPIE—The International Society for Optical Engineering, 1995, vol. 2568, pp. 94-103.
EPO Communication pursuant to Article 94(3) EPC, for European patent application No. 05707215.9, report dated Sep. 14, 2010, 11 Pages.
EPO Communication under Rule 71(3) EPC, for European patent application No. 09706058.6, report dated Oct. 4, 2010, 6 Pages.
EPO Extended European Search Report, for European application No. 10164430.0, dated Sep. 6, 2010, including the extended European search report, pursuant to Rule 62 EPC, the European search report (R. 61 EPC) or the partial European search report/declaration of no search (R. 63 EPC) and the European search pinion, 8 pages.
PCT Notification of Transmittal of the International Search Report and the Written Opinion of the International Searching Authority, or the Declaration, for PCT Application No. PCT/US2008/055964, dated Jul. 30, 2008, 8 pages.
PCT Written Opinion of the International Searching Authority, for PCT Application No. PCT/US2008/055964, dated Jul. 24, 2008, 5 pages.
PCT International Preliminary Report on Patentability for PCT Application No. PCT/US2008/055964, dated Sep. 8, 2009, 6 pages.
Cuiping Zhang and Fernand S. Cohen, Component-Based Active Appearance Models for Face Modelling, D. Zhang and A.K. Jain (Eds.): ICB 2006, LNCS 3832, pp. 206-212, 2005, Springer-Verlag Berlin Heidelberg 2005.
Fundus Photograph Reading Center—Modified 3-Standard Field Color Fundus Photography and Fluorescein Angiography Procedure, Retrieved from the Internet on Oct. 19, 2011, URL: http://eyephoto.ophth.wisc.edu/Photography/Protocols/mod3-ver1.4.html, 3 Pages.
Anatomy of the Eye, Retrieved from the Internet on Oct. 19, 2011, URL: http://www.stlukeseye.com/anatomy, 3 pages.
Fovea centralis, Retrieved from the Internet on Oct. 19, 2011, URL: http://en.wikipedia.org/wiki/Fovea, 4 pages.
Non-Final Office Action mailed Apr. 28, 2011, for U.S. Appl. No. 11/936,085, filed Nov. 7, 2007.
Non-Final Office Action mailed Apr. 28, 2011, for U.S. Appl. No. 11/937,377, filed Nov. 8, 2007.
Non-Final Office Action mailed Mar. 31, 2011, for U.S. Appl. No. 12/551,312, filed Aug. 31, 2009.
Non-Final Office Action mailed May 2, 2011, for U.S. Appl. No. 12/824,214, filed Jun. 27, 2010.
Notice of Allowance mailed Feb. 4, 2011, for U.S. Appl. No. 12/611,387, filed Nov. 3, 2009.
Notice of Allowance mailed Mar. 3, 2011, for U.S. Appl. No. 12/543,405, filed Aug. 18, 2009.
Final Office Action mailed Feb. 16, 2011, for U.S. Appl. No. 12/543,405, filed Aug. 18, 2009.
Final Office Action mailed Jan. 5, 2011, for U.S. Appl. No. 12/611,387, filed Nov. 3, 2009.
Notice of Allowance mailed May 12, 2011, for U.S. Appl. No. 12/043,025, filed Mar. 5, 2008.
Final Office Action mailed Feb. 2, 2011, for U.S. Appl. No. 12/613,457, filed Nov. 5, 2009.
Notice of Allowance mailed Mar. 17, 2011, for U.S. Appl. No. 12/042,335, filed Mar. 5, 2008.
Patent Abstracts of Japan, for Publication No. JP2002-247596, published Aug. 30, 2002, (Appl. No. 2001-044807), Program for Specifying Red Eye Area in Image, Image Processor and Recording Medium. 1 Page.
Patent Abstracts of Japan, publication No. 2002-373337, publication date: Dec. 26, 2002, Method and Device for Changing Pixel Image Into Segment.
Patent Abstracts of Japan, publication No. 2001-229390, publication date: Aug. 24, 2001, Device and Method for Processing Image, Recording Medium and Program.
Patent Abstracts of Japan, publication No. 2003-058894, Publication Date: Feb. 28, 2003, Method and Device for Segmenting Pixeled Image.
Patent Abstracts of Japan, publication No. 2004-236235, Publication Date: Aug. 19, 2004, Imaging Device.
Patent Abstracts of Japan, publication No. 2005-004799, Publication Date: Jan. 6, 2005, Object Extraction Apparatus.
Patent Abstracts of Japan, publication No. 2005-229198, Publication Date: Aug. 25, 2005, Image Processing Apparatus and Method, and Program.
EPO Communication regarding the transmission of the European search report, including European search opinion, and Supplementary European search report, for European application No. 07797335.2, report dated Mar. 30, 2012, 3 Pages.
Eisemann E., Durand F.: "Flash Photography Enhancement via Intrinsic Relighting" ACM Transactions on Graphics, vol. 23, No. 3, Aug. 12, 2004, pp. 673-678, XP002398968, DOI:http://dx.doi.org/10.1145/1015706.1015778.
Braun M., Petschnigg G.: "Information Fusion of Flash and Non-Flash Images"[Online] Dec. 31, 2002, pp. 1-12, XP002398967 Retrieved from the Internet: URL:http://graphics.stanford.edu/~georgp/vision.htm> [retrieved on Sep. 14, 2006].
Sun J., Li Y., Kang S. B., Shum H.-Y.: "Flash Matting", ACM Transactions on Graphics, vol. 25, No. 3, Jul. 31, 2006, pp. 772-778, XP002398969, DOI: http://dx.doi.org/10.1145/1141911.1141954.
Sa A, et al.: "Range-Enhanced Active Foreground Extraction" Image Processing, 2005. ICIP 2005. IEEE International Conference on Genova, Italy Sep. 11-14, 2005, Piscataway, NJ, USA,IEEE, Sep. 11, 2005, pp. 81-84, XP010851333 ISBN: 0-7803-9134-9, DOI: http://dx.doi.org/10.1109/ICIP.2005.1529996.
Database Inspec [Online] The Institution of Electrical Engineers, Stevenage, GB; Aug. 2004, Petschnigg G et al: "Digital photography with flash and no-flash image pairs" XP002398974 Database accession No. 8265342 & ACM SIGGRAPH Aug. 8-12, 2004 Los Angeles, CA, USA, vol. 23, No. 3, Aug. 12, 2005, pp. 664-672, ACM Transactions on Graphics ACM USA ISSN: 0730-0301.

* cited by examiner

FOREGROUND / BACKGROUND SEPARATION IN DIGITAL IMAGES

PRIORITY

This application claims the benefit of priority under 35 USC §119 to U.S. provisional patent application No. 60/746,363, filed May 3, 2006.

BACKGROUND OF THE INVENTION

The present invention provides a method and apparatus for providing improved foreground/background separation in a digital image.

A focus map may be built using a depth from defocus (DFD) algorithm, for example, as disclosed in "*Rational Filters for Passive Depth from Defocus*" by Masahiro Watanabe and Shree K. Nayar (1995), hereby incorporated by reference. The basic idea is that a depth map of a given scene can be theoretically computed from two images of the same scene. Ideally, for calculating a DFD map, a telecentric lens is used, and only focus varies between the two image acquisitions. This is generally not true of existing digital cameras.

Another technique for separating foreground from background is disclosed in US published patent application no. 2006/0285754, which is assigned to the same assignee as the present application, and is hereby incorporated by reference. Here, the difference in exposure levels between flash and non-flash images of a scene are used to provide a foreground/background map. The main advantage of using depth from defocus over a flash/non-flash based technique, is that depth from defocus is independent of the scene illumination and so can be advantageous for outdoor or well-illuminated scenes.

A further technique for separating foreground from background is disclosed in U.S. patent applications No. 60/773,714 and Ser. No. 11/573,713, which are hereby incorporated by reference. Here, a difference in high frequency coefficients between corresponding regions of images of a scene taken at different focal lengths are used to provide a foreground/background map. Again in this case, the foreground/background map is independent of the scene illumination and so this technique can be useful for outdoor or well-illuminated scenes.

In any case, the foreground/background map produced by each of the above techniques or indeed any other technique may not work correctly. It is thus desired to provide improved methods of foreground/background separation in a digital image.

SUMMARY OF THE INVENTION

A method is provided for providing foreground/background separation in a digital image of a scene. A first map is provided including one or more regions within a main digital image. Each region has one or more pixels with a common characteristic. A subject profile is provided corresponding to a region of interest of the main digital image. One or more of the regions is/are compared with the subject profile to determine if any of them intersect with the profile region. One or more of the regions are designated as a foreground region based on the comparison.

The providing of the first map may include provisionally defining each region of the image as foreground or background. The one or more regions include at least one region provisionally defined as foreground.

The designating may include comparing a foreground region with the subject profile. Responsive to the foreground region not substantially intersecting the subject profile, a designation of said foreground region is changed to a background region.

The providing of the first map may be based on a comparison of two or more images nominally of the same scene. One or more of the images that are compared may include a lower resolution version of the main image. One or more of the images that are compared may include the main digital image. Two or more images that are compared may be aligned and/or may be matched in resolution. One or more of the images that are compared may be captured just before or after the main digital image is captured.

The providing of said first map may include providing two of more images each of different focus and nominally of the scene. The method may include calculating from the images a depth of focus map indicating pixels of the main digital image as either foreground or background. The focus map may be blurred. The method may include thresholding the blurred map to an intermediate focus map indicating regions as either foreground or background. Regions within said intermediate focus map may be filled to provide the first map.

The providing of the first map may include providing two or more images each of different focus and nominally of the scene. High frequency coefficients of corresponding regions in the images may be compared to determine whether the regions are foreground or background to provide the first map.

The providing of the first map may include providing two or more images at different exposure levels nominally of the scene. Luminance levels of corresponding regions in the images may be compared to determine whether the regions are foreground or background to provide the first map.

Any of the methods described herein may be operable in a digital image acquisition device that is arranged to select the subject profile according to content of the main digital image and/or the device may be arranged to operate in a portrait mode wherein the subject profile includes an outline of a person. The outline may include one of a number of user selectable outlines and/or may be automatically selected from multiple outlines based on the content of the main digital image.

Any of the methods described herein may be operable in a general purpose computer arranged to receive the first map in association with the main digital image, and/or may be arranged to receive one or more additional images nominally of the scene in association with the main digital image and/or may be arranged to calculate the first map from a combination of one or more additional images and the main digital image.

The providing of a subject profile may include determining at least one region of the image including a face. An orientation may be determined of the face. The subject profile may be defined as including the face and a respective region below the face in the main image in accordance with the orientation.

The providing of the first map may also include analyzing at least one region of the main digital image in a color space to determine a color distribution within the regions. The color distribution may have multiple distinct color peaks. The regions may be segmented based on proximity of a pixel's color to the color peaks.

The comparing may include, for each region intersecting said subject profile, calculating a reference reflectance characteristic, and for each region not intersecting the subject profile, calculating a reflectance characteristic. The non-intersecting region reflectance characteristic may be compared with the reference reflectance characteristic for a region corresponding in color to the non-intersecting region. A non-intersecting region may be designated as foreground when the non-intersecting region reflectance characteristic is determined to be within a threshold of the reference reflectance characteristic.

A second image may be provided nominally of the scene. Reflectance characteristics may be calculated as a function of a difference in luminance levels between corresponding regions in the main image and the second image.

The main image may be one of a stream of images. The determining of at least one region of the main image including a face may include detecting a face in at least one image of the stream acquired prior to the main image. The face may be tracked through the stream of images to determine the face region in the main image.

A further method is provided for foreground/background separation in a digital image of a scene. A first map is provided including one or more regions provisionally defined as one of foreground or background within a main digital image. One or more of the regions may be analyzed to determine a distribution of luminance within pixels of the region. Responsive to the luminance distribution for a region having more than one distinct luminance peak, the region is divided into more than one sub-region based on proximity of pixel luminances to the luminance peaks. The method further includes changing in the map a designation of one or more sub-regions based on the division.

The method may include providing a subject profile corresponding to a region of interest of the main digital image. At least one provisionally defined region may be compared with the subject profile to determine whether the region intersects with the profile region. The method may further include changing in the map a designation of one or more regions or sub-regions based on comparison.

The providing of the first map includes analyzing one or more regions of the digital image in a color space to determine a color distribution within the region. The color distribution may have multiple distinct color peaks. The regions may be segmented based on proximity of pixel color to the color peaks. The analyzed regions may be provisionally defined as foreground within the first map. The digital image may be provided in LAB space, and the color space may include [a,b] values for pixels and the luminance may include L values for pixels.

A further method is provided for improved foreground/background separation in a digital image of a scene. A main digital image may be acquired. At least one region of said main image is determined to include a face, and an orientation of the face is determined. A foreground region is defined in the image including the face, and a respective region below the face is also defined in accordance with the orientation.

An apparatus is provided for providing improved foreground/background separation in a digital image of a scene. The apparatus includes a processor and one or more processor-readable media for programming the processor to control the apparatus to perform any of the methods described herein above or below

BRIEF DESCRIPTION OF THE DRAWINGS

Statement Regarding Black And White Drawings

This patent application file contains at least one drawing executed in black and white photographs. Copies of this patent or patent application publication with black and white photographs drawing(s) will be provided by the Office upon request and payment of the necessary fee.

Figure 1A:
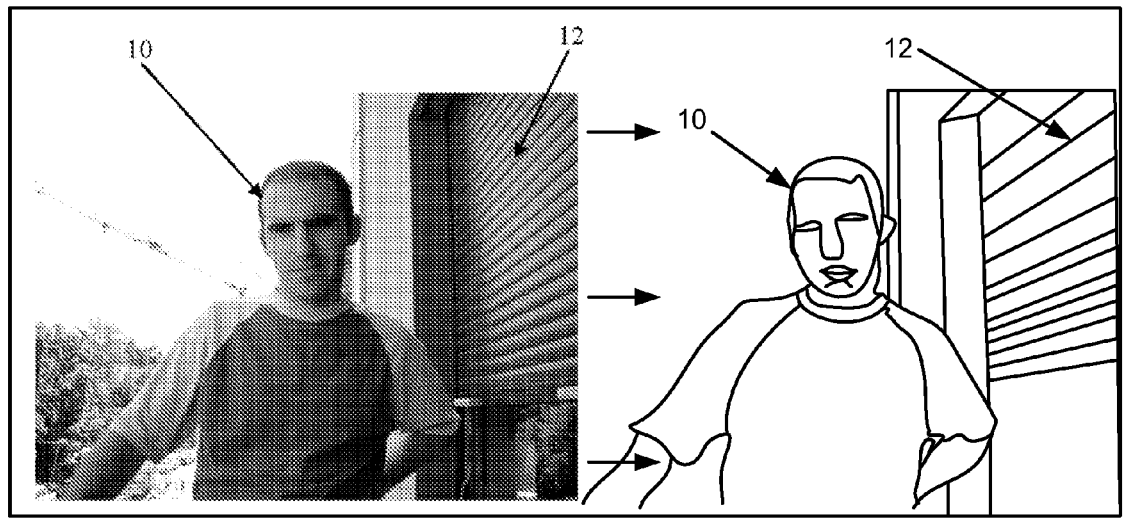
Figure 1B:
Figure 1C:
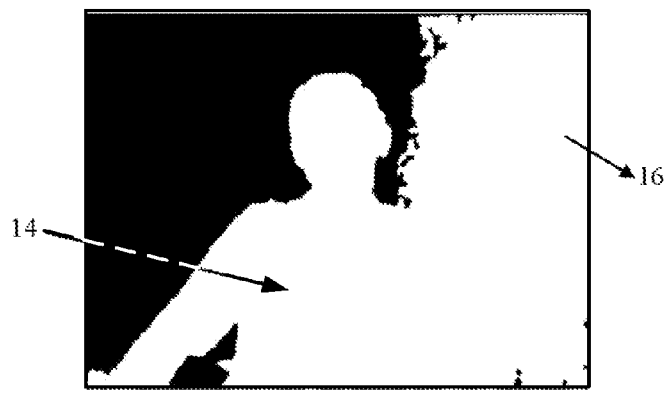
Figure 2:
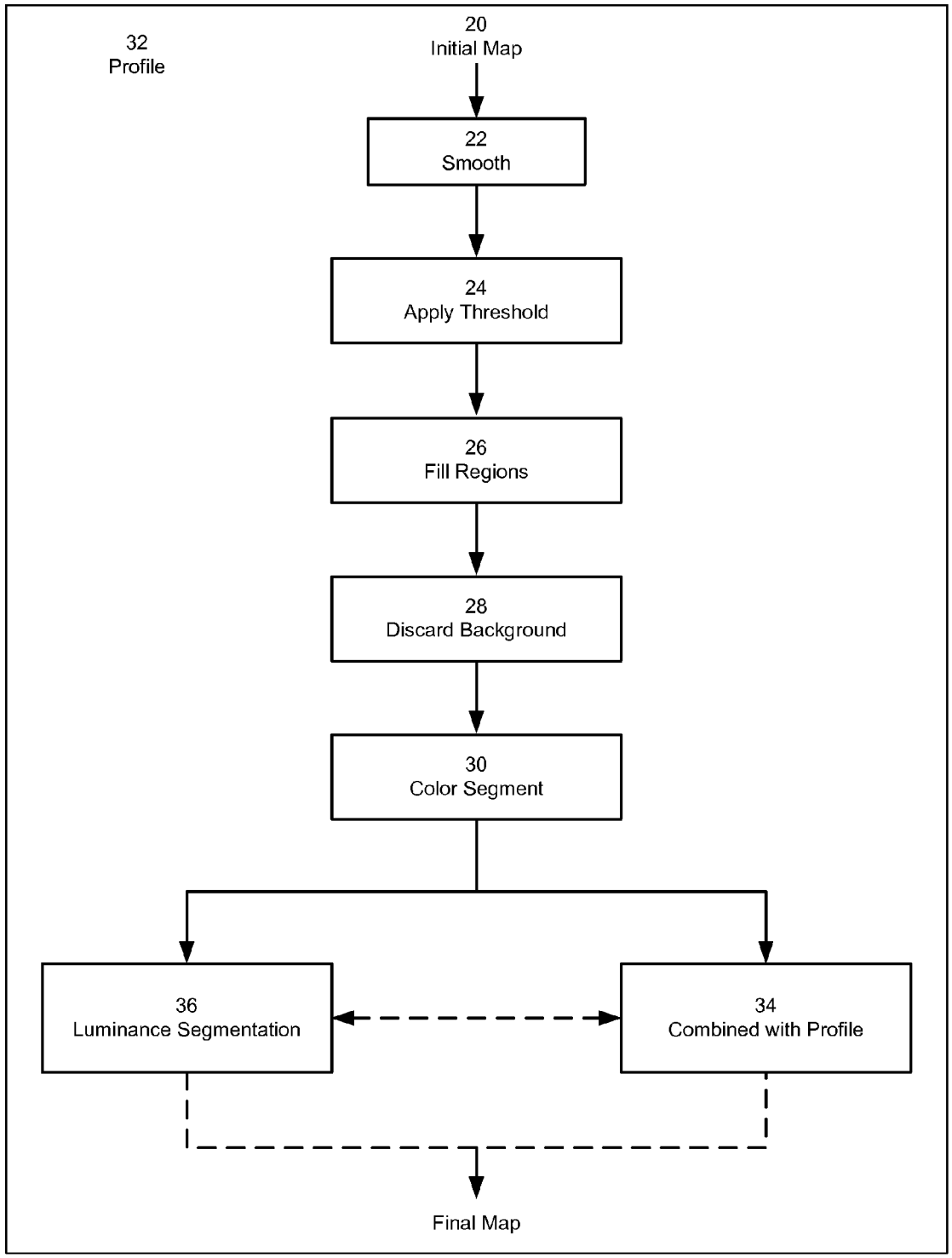
Figure 3A:
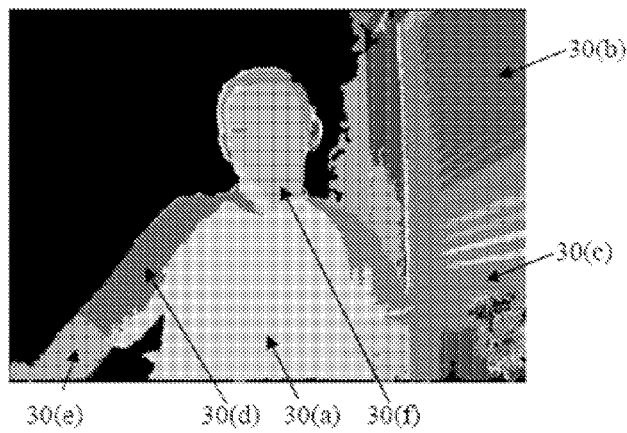
Figure 3B:
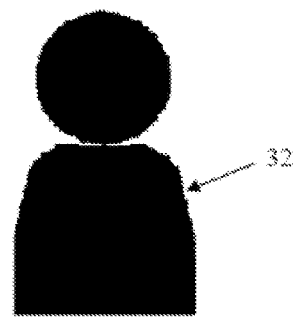
Figure 3C:
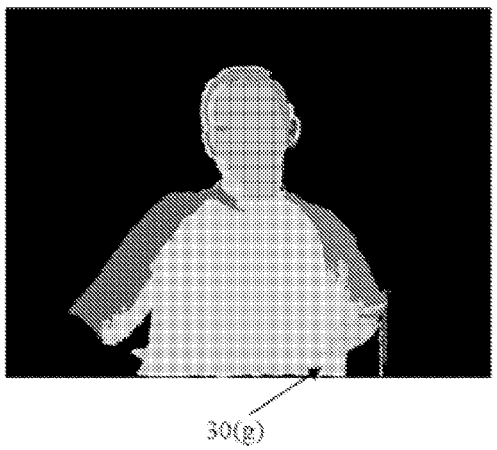
Figure 3D:
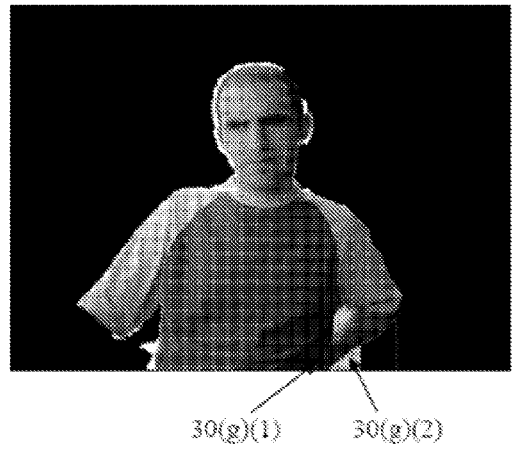
Figure 4A:
Figure 4B:
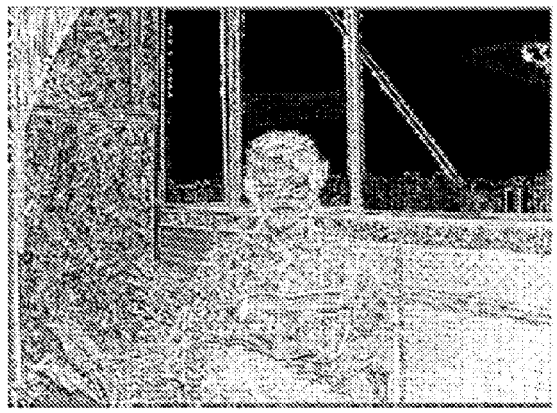
Figure 4C:
Figure 4D:
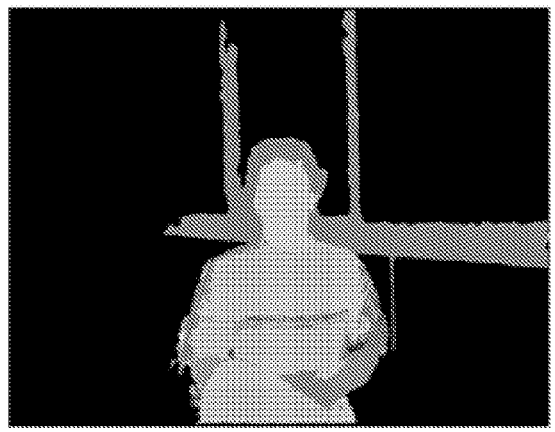
Figure 5A:
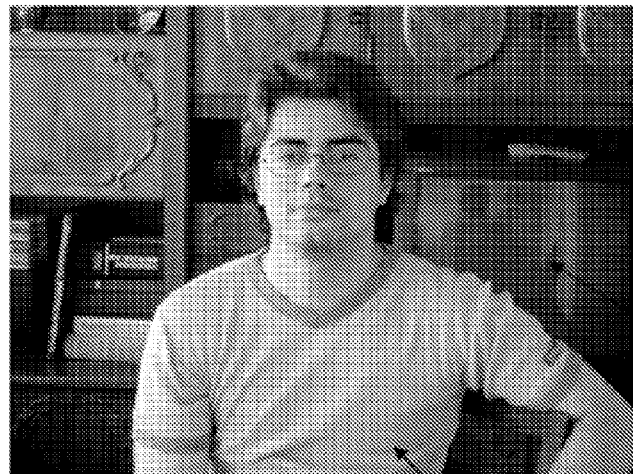
Figure 5B:
Figure 5C:
Figure 6A:
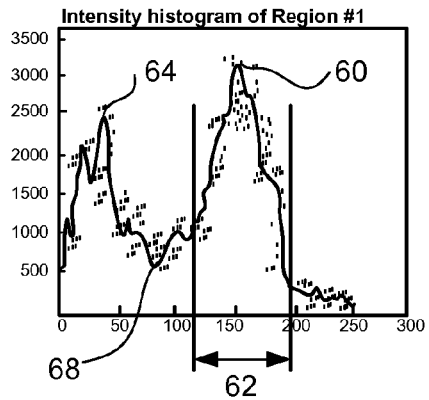
Figure 6B:
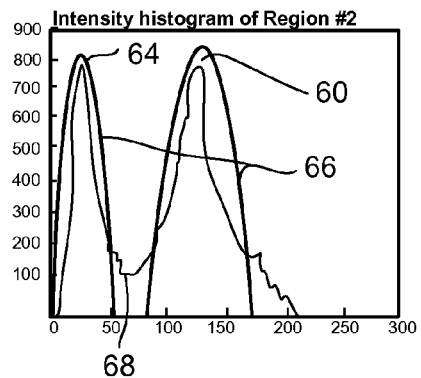
Figure 6C:
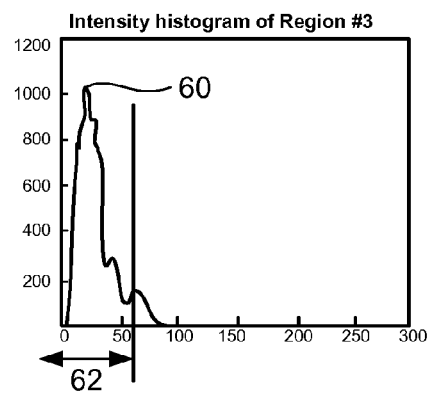
Figure 7:
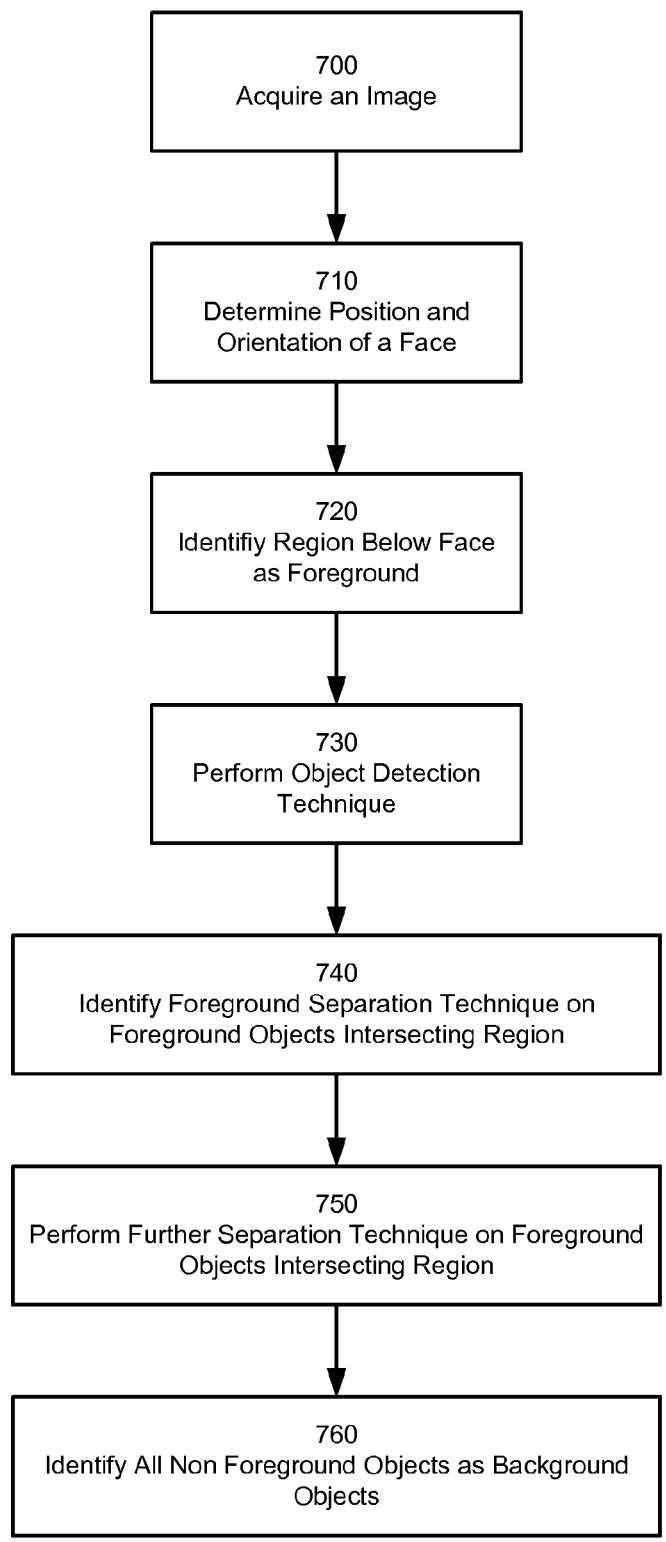
Figure 8:
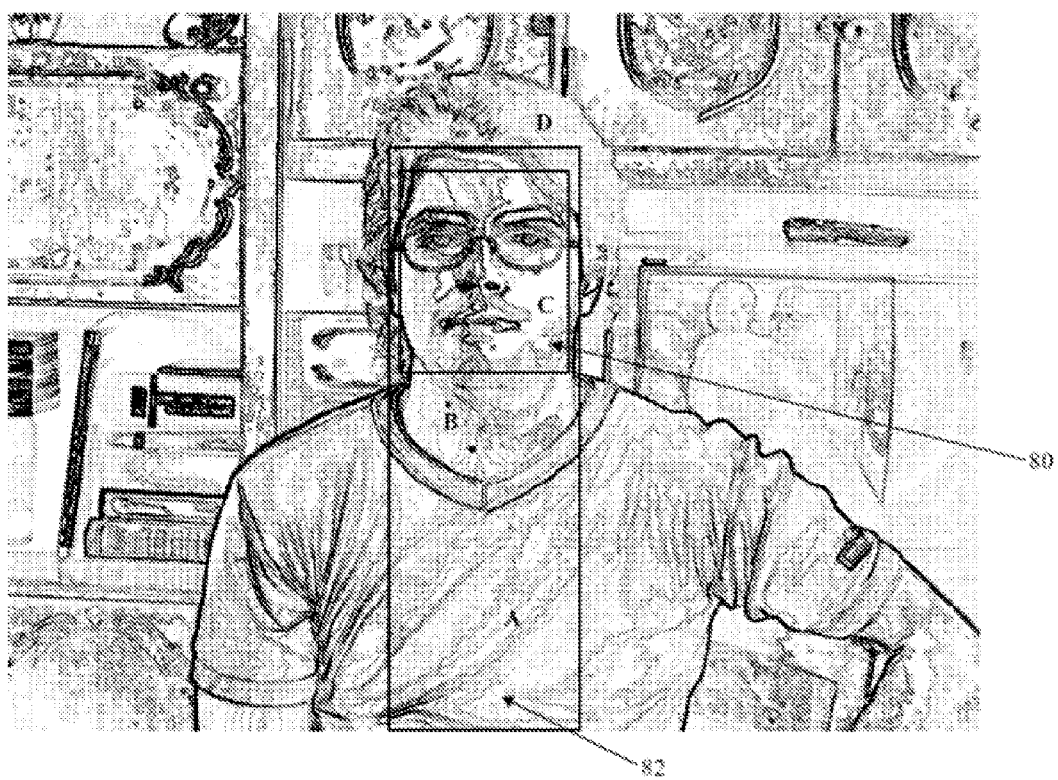
Figure 9:
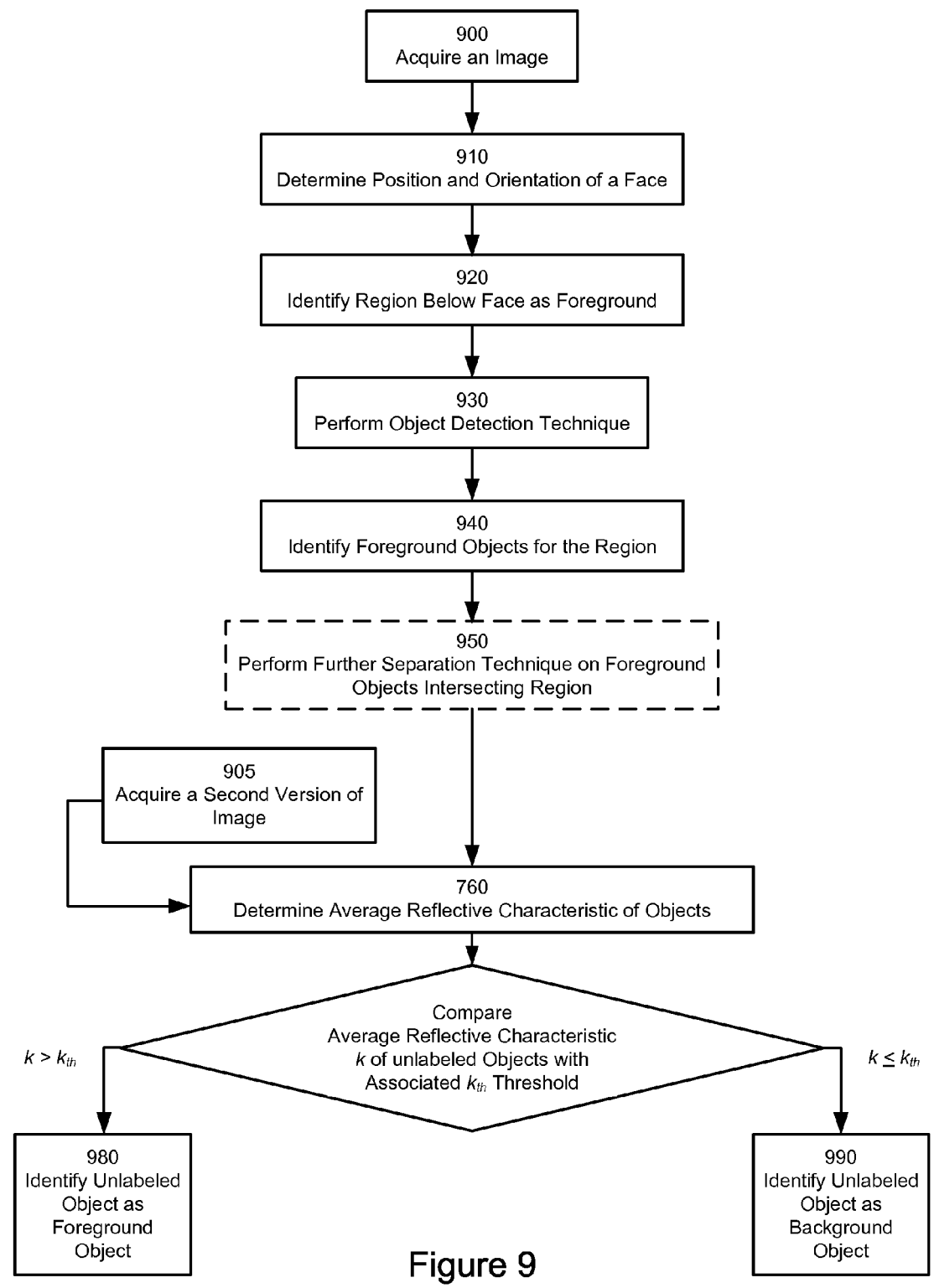

Embodiments of the invention will now be described with reference to the accompanying drawings, in which:

FIG. 1(a) shows an in-focus image of a subject;
FIG. 1(b) shows a DFD map for the image; and
FIG. 1(c) shows the DFD map of FIG. 1(b) partially processed according to a preferred embodiment of the invention;
FIG. 2 shows a flow diagram of a method for improving foreground/background separation according to the preferred embodiment of the invention;
FIG. 3(a) shows a first color segmented version of the foreground regions of the image of FIG. 1(c);
FIG. 3(b) shows a profile for a subject;
FIG. 3(c) shows the result of combining the profile of FIG. 3(b) with the regions of FIG. 3(a) according to an embodiment of the present invention; and
FIG. 3(d) shows the image information for the identified foreground regions of the image of FIG. 3(c);
FIG. 4(a) shows another in-focus image of a subject;
FIG. 4(b) shows a DFD map of the image;
FIG. 4(c) shows a first color segmented version of the foreground regions of the image; and
FIG. 4(d) shows the result of combining a profile with the regions of FIG. 4(c) according to an embodiment of the present invention;
FIG. 5(a) shows another in-focus image of a subject;
FIG. 5(b) shows a first color segmented version of the foreground regions of the image; and
FIG. 5(c) shows a further improved color segmented version of the foreground regions of the image when processed according to an embodiment of the present invention;
FIG. 6(a)-(c) show luminance histograms for regions identified in FIG. 5(a);
FIG. 7 is a flow diagram illustrating an alternative segmentation method for foreground-background separation in digital images;
FIG. 8 shows regions identified with an image processed in accordance with the method of FIG. 7; and
FIG. 9 is a flow diagram illustrating a further alternative segmentation method for foreground-background separation in digital images.

DETAILED DESCRIPTION OF THE EMBODIMENTS

The present invention is employed where there is a need for foreground/background segmentation of a digital image. There are many reasons for needing to do so, but in particular, this is useful where one of the foreground or the background of an image needs to be post-processed separately from the other of the foreground or background. For example, for red-eye detection and correction, it can be computationally more efficient to only search and/or correct red-eye defects in foreground regions rather than across a complete image. Alternatively, it may be desirable to apply blur only to background regions of an image. Thus, the more effectively foreground can be separated from background, the better the results of image post-processing.

In the preferred embodiment, improved foreground/background segmentation is implemented within digital camera image processing software, hardware or firmware. The segmentation can be performed at image acquisition time; in a background process, which runs during camera idle time; or in response to user interaction with image post-processing software. It will nonetheless be seen that the invention could equally be implemented off-line within image processing software running on a general-purpose computer.

In any case, in the preferred embodiment, a user operating a camera selects, for example, a portrait mode and optionally a particular type of portrait mode, for example, close-up, mid-shot, full length or group. In portrait mode, the camera then acquires a main image or indeed the camera acquires one of a sequence of preview or post-view images generally of the main image scene. Generally speaking, these preview and post-view images are of a lower resolution than the main image. As outlined above, at some time after image acquisition, image processing software calculates either for the main image or one of the preview/post-view images an initial foreground/background map.

The preferred embodiment will be described in terms of the initial map being a DFD map, although it will be appreciated that the invention is applicable to any form of initial foreground/background map as outlined above. In the embodiment, the segmentation process provides from the initial map, a final foreground/background map, where the foreground region(s), ideally, contain the image subject and which can be used in further image processing as required.

FIG. 1(a) shows an in-focus image of a scene including a subject (person) 10 and FIG. 1(b) the resulting DFD map. The DFD map has, in general, a number of problems in that:
  objects such as the shutters 12 that lie in the neighborhood of the subject although at different depths appear in-focus (which is normal, but undesired) and as such can be falsely classified as foreground objects; and
  the DFD map is very noisy, i.e., it is far from being smooth.

Referring now to FIG. 2, the foreground/background segmentation processing of the DFD map to provide the final foreground/background map is shown:

The initial DFD map 20, for example, as shown in FIG. 1(b), is first smoothed or blurred with a Gaussian kernel, step 22. The DFD map of FIG. 1(b) is in a binary form with white regions being classified as foreground and black being background. Smoothing/blurring the map will tend to indicate foreground regions as generally lighter and background regions as generally darker.

A threshold is then applied, step 24, to the smoothed continuously valued image from step 22. This provides a binary map in general having larger and smoother contiguous regions than the initial DFD map 20.

Regions of the binary map obtained at step 24 are then filled, step 26, to remove small regions within larger regions. For the initial image of FIG. 1(a), an initial foreground/background map as shown in FIG. 1(c) is produced. Here foreground is shown as white and background as black. It will be seen that in this map, there is no distinction between the foreground subject region 14 and the region 16 which should be in the background.

The pixels classified as background in the image of FIG. 1(c) are excluded from further processing, step 28, and the remaining regions of the images are regarded as provisional foreground regions.

The remainder of the image is segmented by color, using any suitable technique, step 30. In the preferred embodiment, a "mean shift" algorithm, based on D. Comaniciu & P. Meer, "Mean Shift: A Robust Approach toward Feature Space Analysis" IEEE Trans. Pattern Analysis Machine Intell., Vol. 24, No. 5, 603-619, 2002) is employed. In general, this technique involves identifying discrete peaks in color space and segmenting the image into regions labelled according to their proximity to these peaks.

While this technique can be performed in RGB space, for the sake of computational complexity, the preferred embodiment operates on [a,b] parameters from an LAB space version of the foreground region 14, 16 pixels. This means that for an image captured in RGB space, only pixels for candidate foreground regions need to be transformed into LAB space. In any case, it should be noted that this [a,b] based segmentation is luminance (L in LAB space) independent. This segmentation produces a map as shown in FIG. 3(a), where the different shaded regions 30(a) . . . 30(f) etc represent a region generally of a given [a,b] color combination.

In a first improvement of foreground/background segmentation according to the present invention, a portrait template corresponding to the acquired image is provided, FIG. 3(b). The template includes a profile 32 of a subject. The exact size of a particular profile can be varied according to the focal length for the acquired image in accordance with the expected size of a subject. It will be seen that while the profile 32 shown in FIG. 3(b) is a mid-shot of a subject, the outline can be varied according to the expected pose of a subject. This can either entered manually by a user, by selecting a suitable portrait mode, or possibly predicted by the image processing software. Thus, the profile might be a head shot outline or a full body outline, in one of a plurality of poses, or indeed in the case of a group portrait, an outline of a group.

In any case, the color segments provided in step 30 are combined with the profile 32 to retain only color regions that overlap to a significant extent with the profile 32. Thus, with reference to FIG. 3(a), it will be seen that inter alia regions 30(b),(c) and (e) are removed from the foreground map, while inter alia regions 30(a),(d) and (f) are retained. The final set of foreground regions is shown shaded in FIG. 3(c), with the final background region being indicated as black. It will been seen, however, from FIG. 3(d)) that some regions such as sub-region 30(g) of region 30(a) are still not as accurately segmented as they might be.

It will be seen that sub-regions 30(g)(1) and 30(g)(2), because they may have similar [a,b], characteristics have been included in region 30(a) which in turn has been classified as a foreground region, whereas sub-region 30(g)(2) should more suitably be classed as a background.

It is also acknowledged that parts of the foreground can be (wrongly) removed from the foreground map from various reasons. For instance, in FIG. 3(d), it can be seen that the subject's right hand has been removed from the foreground map because it does not overlap with portrait profile 32.

Another example of the segmentation of steps 22-34 is illustrated with reference to FIG. 4. FIG. 4(a) shows an in-focus image and FIG. 4(b) the DFD map for the image. FIG. 4(c) shows the segmented map after color segmentation, step 30. FIG. 4(d) shows the final foreground/background map after elimination of regions, such as 40(a),(b) that do not overlap significantly to a portrait template 32 chosen for the image.

In this case that, because color segmentation did not separate the subject's hair from the balcony's edges, region 40(c), the balcony edges have been wrongly included in the final map as foreground regions.

In a still further example, FIG. 5(a) shows an in-focus image of a subject and FIG. 5(b), the foreground/background map after color segmentation, step 30, but before combining the foreground regions with a profile 32. Two segmentation artifacts can be seen at this stage: the subject's T-shirt 50 and the TV 52 behind are segmented in a single region; and, similarly, half the subject's face and hair 54 are merged into a single region. The latter defect (accidentally) will not affect the final results, as both hair and face are ideally included in a final foreground map. On the contrary, not separating the T-shirt 50 from the TV 52 results in (wrongly) retaining the latter in the foreground map.

In a second improvement of foreground/background segmentation according to the present invention, foreground regions are analysed according to luminance, step 36. This step can be performed in addition to, independently of, or before or after step 34. In the preferred embodiment, this analysis is again performed on an LAB space version of the foreground region 14, 16 pixels and so can beneficially use only the L values for pixels as is described in more detail below.

In step 36, the intensity of the pixels in regions of the image of interest is analysed to determine if the luminance distribution of a region is unimodal or bimodal. This, in turn, allows difficult images to have their foreground/background regions better separated by applying unimodal or bimodal thresholding to different luminance sub-regions within regions of the image.

In the case of FIG. 5, both the T-shirt/TV 50/52 and hair/face pairs 54 strongly differ in luminance. In step 36, the luminance histogram of each segmented foreground region is computed. FIG. 6 shows the luminance histograms of region #1 comprising the T-shirt/TV 50/52; region #2 comprising the hair/face 54; and region #3 shows a typical unimodal distribution. As can be seen from FIG. 6, the luminance histograms of regions that should be further segmented (i.e., regions #1 and 2) are bi-modal, whereas others (region #3) are not.

It should also be noted that multi-modal histograms could also be found for a region, indicating that the region should be split into more than two regions. However, the instances of such a distribution are likely to be very rare.

Given that regions which exhibit such a bi-modal distribution in luminance should be ideally segmented further, it is useful to conveniently classify a given histogram as either unimodal or bimodal. Referring to FIG. 6, in the preferred embodiment, this classification comprises:
(i) blurring/smoothing the histogram to reduce artifacts;
(ii) finding a maximum luminance 60 in the histogram;
(iii) discarding a given-width interval 62, FIG. 6(a), around the maximum coordinate (to avoid detection of false maxima);
(iv) finding the next maximum 64;
(v) from each of the two maxima, a mode-detection procedure is run to find the corresponding mode—a Bell shaped distribution around each maximum, 66, FIG. 6(b);
(vi-a) if both found modes include a significant portion of the histogram (i.e., if each spans an interval of luminance levels that includes more than 20% of the pixels from regions of interest) then the histogram is declared bimodal, and the minimum value 68 in the interval between the two maxima is used as a threshold for splitting the region into 2 sub-regions; otherwise,
(vi-b) the histogram is said to be unimodal, and nothing is changed.

FIG. 5(c) presents the result of the final segmentation, where one can see the correct separation of T-shirt/TV and of hair/face pairs. Regions which are considered unimodal are not changed.

Using the present invention, more of an in-focus subject can be correctly separated from the background, even in difficult images, i.e., images with background located very close to the subject. Even when portions of background cannot be separated from the foreground or vice versa, the artifacts are less likely to be big, and the final map can be more useful for further post-processing of the image.

There are a number of practical issues, which need to be considered when implementing the invention:

When the initial map is derived from a DFD map, then the scaling factor between the in-focus and out-of-focus images will need to be known. This needs to be accessible from the camera configuration at image acquisition, as it cannot be computed automatically. It is derivable from knowing the focal length for the acquired image, and so this should be made available by the camera producer with the acquired image.

It will also be seen that where the initial map is derived from a DFD map, some shifting between images may have taken place, depending upon the time between acquiring the two images. It will be seen that the subject may move significantly with respect to the background, or the whole scene may be shifted owing to camera displacement. As such appropriate alignment between images prior to producing the DFD map should be performed.

As indicated earlier, the invention can be implemented using either full resolution images or sub-sampled versions of such images, such as pre-view or post-view images. The latter may in fact be necessary where a camera producer decides double full resolution image acquisition to provide a full resolution DFD map is not feasible. Nonetheless, using a pair comprising a full-resolution and a preview/postview, or even a pair of previews/postviews for foreground/background mapping may be sufficient and also preferable from a computational efficiency point of view.

It will also be seen that it may not be appropriate to mix flash and non-flash images of a scene for calculating the DFD map. As such, where the main image is acquired with a flash, non-flash preview and post-view images may be best used to provide the foreground/background map in spite of the difference in resolution vis-à-vis the main image.

In a still further aspect of the present invention there is provided a further improved segmentation method for foreground-background separation in digital images.

In the embodiments of FIGS. 1 to 6, the portrait profile 32 is stored in a database for comparison with color segments for an image.

However, it has been found that an alternative profile can be provided by detecting the position and orientation of one or more faces in an image, and adding to the or each face region, a respective area, preferably including a column below the face region as indicated by the orientation of the face. As before, a profile including each face region and associated column can be assumed to comprise foreground pixels only.

While this profile can be used instead of the profile(s) 32 of FIGS. 1 to 6, the information provided in this presumed foreground column(s), can also be used to provide improved separation of the image into foreground and background as described in more detail below.

Referring now to FIG. 7, there is provided a flow diagram of this embodiment.

An image is acquired 700. As before, the image can be either be a pre- or post-view image or include a down-sampled version of a main acquired image.

A face is either detected in the acquired image or, if the face is detected in a previous image of a stream of images including the acquired image, the face region is tracked to determine a face position and its orientation within the acquired image 710. The detection of the position and orientation as well as tracking of a detected face is preferably carried out as disclosed in U.S. patent application No. 60/746,363 filed Aug. 11, 2006.

The orientation of a detected/tracked face is used to determine an area below the detected face in the direction of the face and the combined face region and associated area provides a profile template assumed to contain foreground pixels only, 720.

Referring now to FIG. 8, an acquired image 10 corresponding to the image of FIG. 5(a) includes a subject and the subject's face is detected and/or tracked to lie within the region 80. Given the orientation of the face, a region 82 bounding the face region 80 and extending from the bottom of the face region 80 to the edge of the image is defined.

It can be seen that a number of separate objects lie within or intersect the region 82. In the example, these might comprise regions bounding the subject's shirt (A), the subject's neck and face right side (B), the subject's face left side (C) and the subject's hair (D).

Preferably, these objects are segmented, step 730, by means of a color object detection technique such as Color Wizard, edge detection, or other region separation techniques applied on color or grey level images including but not limited to those described for the embodiments of FIGS. 1 to 6. In the present embodiment, each object A ... D identified at step 730 and lying within or intersecting the region 82 is designated as being (at least in so far as it intersects the region 82) a foreground object 740.

Preferably, each foreground object that intersects the region 82 is further subjected to luminance analysis, step 750, to determine whether the luminance distribution of the object is unimodal or bimodal as described above. Applying unimodal or bimodal thresholding to different luminance sub-objects within objects intersecting the region 82 can lead to better separation of the foreground/background objects. Thus, objects previously identified as foreground, may now comprise a sub-object identified as a foreground object and a sub-object identified as a background object.

Again, this analysis is preferably performed on an LAB space version of the foreground object pixels and so can beneficially use only the L values for pixels.

Any object (or sub-object) identified in steps 740 and optionally 750 that does not lie within or intersect region 82 is designated as a background object, 760. In this manner, the image is separated into foreground and background objects.

In this embodiment of the present invention, foreground/background segmentation is carried out only on a restricted portion of the image including the region 82. In a still further aspect of the present invention there is provided a further improved segmentation method for foreground-background separation of complete digital images.

Referring now to FIG. 9, there is provided a flow diagram of this embodiment.

A first and second image nominally of the same scene are acquired, 900, 905. As before, these images can either be pre- or post-view images or include a down-sampled version of a main acquired image. For this embodiment, one of the images is taken with a flash and the other without a flash to provide a difference in exposure levels between images.

The images are aligned (not shown), so that object segments identified in the image in steps 900 to 950 (corresponding with steps 700 to step 750 of FIG. 7) are assumed to correspond with segments of the image acquired in step 905.

Where foreground objects identified in step 940/950 are segmented by color, each object comprises a number of pixels having a one of a number of particular color characteristics e.g. similar AB values in LAB space.

The embodiment of FIG. 9 is based on the assumption that each foreground object color combination has an associated average reflective characteristic k that represents the expected behavior of any foreground object having the same color combination. Therefore, by comparing the average reflective characteristic k of any object in the image with the average reflective characteristic k of an identified foreground object having the same color combination, the object can be identified as foreground or background.

In this embodiment, the acquired image on which face detection/tracking was performed is thus compared with the second image of the scene to determine 960 an average reflective characteristic k for each object in the aligned images according to the following equation:

$$Avg\left(\frac{L_{Flash} - L_{Non-Flash}}{L_{Non-Flash}}\right) = k$$

where $L_{Flash}$ is the luminance of an object in the flash image and $L_{Non-Flash}$ is the luminance of the corresponding object in the non-flash image. If the value of k>0, the object is reflective and if k<0, the object is not reflective, which situations may occur due to interference or noise.

For each unlabeled object, i.e. objects which do not intersect or lie within the region 82, having the same color combination as an identified foreground object, its average reflective characteristic k is compared with a threshold value $k_{th}$ derived from that of the associated foreground object, step 970. So for example, in FIG. 8 a threshold value $k_{th}$ is calculated as 70% of the average reflective characteristic k for each object A ... D, and a reflective characteristic k is calculated for each unlabeled object. The reflective characteristic k for each unlabeled object is compared with the threshold value $k_{th}$ of whichever one of objects A to D corresponds in color to the unlabeled object.

Thus, in the present embodiment, if the unlabeled object has an average reflective characteristic k of greater than approximately 70% of the associated foreground object, it is identified as a foreground object, 980. Otherwise, it is identified as a background object, 990.

In the case where an unlabeled object comprises pixels having a color combination that does not correspond to the color combination of any of the identified foreground objects, the threshold value $k_{th}$ for objects of that color may be estimated as a function of the reflective characteristic(s) of identified foreground objects, e.g. objects A ... D, having the most similar color combinations.

In the embodiments of FIGS. 7 and 9 all of an object or sub-object intersecting the section if considered to be a foreground object. In a variation of these embodiments, foreground objects intersecting the region 82 identified in steps 940/950 further subjected to further luminance analysis based on their average reflective characteristic, k.

Thus, a sub-region of each intersecting object wholly within the region 82 is confirmed as a foreground object. Now a reflective characteristic is calculated for each pixel of the object lying outside the region 82. Growing out from the region 82, object pixels neighboring the sub-region are compared pixel-by pixel with the reflective characteristic of the object sub-region with the region 82. Again, where a pixel value is above a threshold proportion of the reflective characteristic k, say 70%, it is confirmed as being a foreground pixel. The sub-region is therefore grown either until all pixels of the object are confirmed as foreground or until all pixels neighbouring the growing sub-region are classed as background. Smoothing and hole filling within the grown region may then follow before the foreground/background map is finalized.

The invention claimed is:

1. A method for providing separation between foreground and background regions in a digital image of a scene, comprising:
   using a processor-based digital image acquisition device including a processor programmed by processor-readable code embedded within one or more digital storage media;

providing a first map comprising two or more regions within a main digital image, each having one or more pixels with a common characteristic;

comparing values of a second characteristic of the one or more pixels that varies in accordance with a known relationship to the common characteristic;

providing a subject profile corresponding to a region of interest of said main digital image, wherein said providing a subject profile comprises:

determining at least one region of said main digital image including a subject's face;

determining an orientation of said at least one face within said main digital image; and defining said subject profile as comprising said at least one face region including the subject's face and a respective region below said face region including at least a portion of the subject's neck or shirt, or both, in said main digital image in accordance with said orientation;

and wherein the method further comprises:

comparing one or more of said one or more regions with said subject profile to determine if any of said one or more of said one or more regions intersect with said subject profile; and designating one or more of said one or more of said one or more regions as a foreground region based on said comparison.

2. A method as claimed in claim 1 wherein providing said first map comprises provisionally defining each of said one or more regions of said main digital image as foreground or background and wherein said one or more regions comprise at least one region provisionally defined as foreground.

3. A method as claimed in claim 2 wherein said designating comprises:

comparing a foreground region with said subject profile; and responsive to said foreground region not substantially intersecting said subject profile, changing a designation of said foreground region to a background region.

4. A method as claimed in claim 1 wherein the providing of said first map is based on a comparison of two or more images nominally of said scene.

5. A method as claimed in claim 4 wherein one or more of said two or more images that are compared comprises a lower resolution version of said main digital image.

6. A method as claimed in claim 4 wherein one of said two or more images that are compared comprises said main digital image.

7. A method as claimed in claim 4 further comprising aligning said two or more images that are compared.

8. A method as claimed in claim 4 further comprising matching resolutions of said two or more images that are compared.

9. A method as claimed in claim 4 wherein at least one of said two or more images that are compared is captured just before or after said main digital image is captured.

10. A method as claimed in claim 1 wherein the providing of said first map comprises:

providing two of more images each of different focus and nominally of said scene;

calculating from said images a depth of focus map indicating pixels of said main digital image as either foreground or background;

blurring said focus map;

thresholding said blurred map to an intermediate focus map indicating regions as either foreground or background; and filling regions within said intermediate focus map to provide said first map.

11. A method as claimed in claim 1, wherein the providing of said first map comprises:

providing two or more images each of different focus and nominally of said scene; and comparing high frequency coefficients of corresponding regions in said images to determine whether said one or more of said one or more regions comprise foreground or background to provide said first map.

12. A method as claimed in claim 1 wherein the providing of said first map comprises:

providing two or more images at different exposure levels nominally of said scene; and comparing luminance levels of corresponding regions in said images to determine whether said one or more of said one or more regions are foreground or background to provide said first map.

13. A method as claimed in claim 1 operable in a digital image acquisition device, said device being arranged to select said subject profile according to content of said main digital image.

14. A method as claimed in claim 1 operable in a digital image acquisition device, said device being arranged to operate in a portrait mode and wherein said subject profile comprises an outline of a person.

15. A method as claimed in claim 14 wherein said outline comprises one of a number of user selectable outlines.

16. A method as claimed in claim 14 wherein said outline is automatically selected from a plurality of outlines based on content of said main digital image.

17. A method as claimed in claim 1 operable in a general purpose computer arranged to receive said first map in association with said main digital image.

18. A method as claimed in claim 1 operable in a general purpose computer arranged to receive one or more additional images nominally of said scene in association with said main digital image and being arranged to calculate said first map from any combination of said one or more additional images and said main digital image.

19. A method as claimed in claim 1 wherein said providing a first map comprises:

analyzing at least one region of the main digital image in a color space to determine a color distribution within said at least one region, said color distribution having a plurality of distinct color peaks; and segmenting said at least one region based on proximity of a pixel's color to said color peaks.

20. A method as claimed in claim 1 wherein said main digital image is one of a stream of images and wherein determining at least one region of said main image including a face comprises:

detecting a face in at least one image of said stream acquired prior to said main digital image; and tracking said face through said stream of images to determine said face region in said main digital image.

21. An apparatus for providing improved separation between foreground and background regions in a digital image of a scene, comprising a processor and one or more processor-readable media for programming the processor to control the apparatus to perform a method comprising:

acquiring a main digital image;

providing a first map comprising one or more regions provisionally defined as one of foreground or background within said main digital image, each having one or more pixels with a common characteristic;

comparing values of a second characteristic of the one or more pixels that varies between foreground and background distances in accordance with a known relationship to the common characteristic;

providing a subject profile corresponding to a region of interest of said main digital image, wherein said providing a subject profile comprises:

determining at least one region of said image including a subject's face determining a orientation of said at least one face within said main image; and defining said subject profile as comprising said at least one face region including the subject's face and a respective region below said face region including at least a portion of the subject's neck or shirt, or both, in said main digital image in accordance with said orientation;

and wherein the method further comprises:

comparing at least one of said one or more provisionally defined regions with said subject profile to determine if any of said at least one of said one or more provisionally defined regions intersect with said profile region; and changing in said map a designation of one or more of said at least one of said one or more provisionally defined regions as a foreground region based on said comparison.

22. The method of claim 1, wherein said comparing comprises comparing said at least one of said one or more provisionally defined regions with said subject profile to determine if any of said at least one of said one or more provisionally defined regions comprise a shape or luminance distribution, or both, that matches that of said subject profile.

23. The method of claim 1, wherein said one or more regions each comprise one or more approximately relatively still regions, and said comparing comprises comparing one or more approximately relatively still regions with said subject profile to determine if any of said one or more approximately relatively still regions intersect with said subject profile, and wherein said designating comprises designating one or more of said approximately relatively still regions as a foreground region based on said comparison.

24. The method of claim 1, wherein said providing a subject profile comprises providing data including a stored shape or luminance distribution, or both, said subject profile not being acquired from a previous image of substantially a same scene as said main digital image, for comparison with said at least one of said one or more regions.

25. The method of claim 1, wherein said providing a subject profile comprises providing data including a stored face region having a relative size next to a second feature, said subject profile not being acquired from a previous image of substantially a same scene as said main digital image, for comparison with one or more face regions of the one or more regions within said main digital image, and the comparing comprises comparing said relative size of said stored face region next to said second feature with that of said subject profile to determine if at least one of said one or more face regions intersect with said subject profile.

26. An apparatus for providing improved separation between foreground and background regions in a digital image, comprising a processor and one or more processor-readable media for programming the processor to control the apparatus to perform a method comprising:

acquiring a main digital image;

providing a first map comprising one or more regions within said main digital image, each having one or more pixels with a common characteristic;

comparing values of a second characteristic of the one or more pixels that varies in accordance with a known relationship to the common characteristic;

providing a subject profile that comprises a stored shape or luminance distribution, or both, said subject profile not being acquired from a previous image of substantially a same scene as said main digital image, for comparison with said one or more regions;

comparing one or more of said one or more regions with said subject profile to determine if any of said one or more of said one or more regions intersect with said subject profile, wherein said comparing comprises:

determining at least one region of said image including a subject's face;

determining an orientation of said at least one face within said main digital image; and comparing said subject profile with said at least one face region including the subject's face and a respective region below said face region including at least a portion of the subject's neck or shirt, or both, in said main digital image in accordance with said orientation;

and wherein the method further comprises designating one or more of said one or more of said one or more regions as a foreground region based on said comparison.

27. An apparatus for providing improved separation between foreground and background regions in a digital image of a scene, comprising a processor and one or more processor-readable media for programming the processor to control the apparatus to perform a method comprising:

acquiring a main digital image;

providing a first map comprising one or more face regions within a main digital image;

comparing values of a second characteristic of the one or more pixels that varies in accordance with a known relationship to the common characteristic;

providing a subject profile that comprises a stored face region having a relative size next to a second feature, said subject profile not being acquired from a previous image of substantially a same scene as said main digital image, for comparison with said one or more face regions within said main digital image;

comparing said relative size of said stored face region next to said second feature with that of said subject profile to determine if any of said one or more face regions intersect with said subject profile, wherein said comparing comprises:

determining at least one region of said main digital image including a subject's face;

determining an orientation of said at least one face within said main digital image; and comparing said subject profile with said at least one face region including the subject's face and a respective region below said face region including at least a portion of the subject's neck or shirt, or both, in said main digital image in accordance with said orientation;

and wherein the method further comprises:

designating at least one of said one or more regions as a foreground region based on said comparison.

28. An apparatus for providing improved separation between foreground and background regions in a digital image of a scene, comprising a processor and one or more processor-readable media for programming the processor to control the apparatus to perform a method comprising:

acquiring a main digital image;

providing a first map comprising one or more regions within a main digital image, each having one or more pixels with a common characteristic;

comparing values of a second characteristic of the one or more pixels that varies in accordance with a known relationship to the common characteristic;

providing a subject profile corresponding to a region of interest of said main digital image, wherein said providing a subject profile comprises:

determining at least one region of said main digital image including a subject's face;

determining an orientation of said at least one face within said main digital image; and defining said subject profile as comprising said at least one face region including the subject's face and a respective region below said face region including at least a portion of the subject's neck or shirt, or both, in said main digital image in accordance with said orientation;

and wherein the method further comprises:

comparing one or more of said one or more regions with said subject profile to determine if any of said one or more of said one or more regions comprise a shape or luminance distribution, or both, that matches that of said subject profile; and designating one or more of said one or more of said one or more regions as a foreground region based on said comparison.

29. An apparatus for providing improved separation between foreground and background regions in a digital image of a scene, comprising a processor and one or more processor-readable media for programming the processor to control the apparatus to perform a method comprising:

acquiring a main digital image;

providing a first map comprising one or more approximately relatively still regions within said a main digital image, each having one or more pixels with a common characteristic;

comparing values of a second characteristic of the one or more pixels that varies in accordance with a known relationship to the common characteristic;

providing a subject profile corresponding to a region of interest of said main digital image, wherein said providing a subject profile comprises:

determining at least one region of said main digital image including a subject's face;

determining an orientation of said at least one face within said main digital image; and defining said subject profile as comprising said at least one face region including the subject's face and a respective region below said face region including at least a portion of the subject's neck or shirt, or both, in said main digital image in accordance with said orientation;

and wherein the method further comprises:

comparing said one or more approximately relatively still regions with said subject profile to determine if any of said one or more approximately relatively still regions intersect with said subject profile; and designating at least one of said one or more of said approximately relatively still regions as a foreground region based on said comparison.

* * * * *